(12) United States Patent
Fecteau et al.

(10) Patent No.: US 7,745,364 B2
(45) Date of Patent: Jun. 29, 2010

(54) PROCESS FOR REGENERATING CATALYST FOR A HYDROCARBON CONVERSION ZONE

(75) Inventors: David J. Fecteau, Prospect Heights, IL (US); Leon Yuan, Rockville, MD (US)

(73) Assignee: UOP LLC, Des Plaines, IL (US)

( * ) Notice: Subject to any disclaimer, the term of this patent is extended or adjusted under 35 U.S.C. 154(b) by 624 days.

(21) Appl. No.: 11/697,346

(22) Filed: Apr. 6, 2007

(65) Prior Publication Data

US 2008/0159930 A1 Jul. 3, 2008

Related U.S. Application Data

(60) Provisional application No. 60/882,689, filed on Dec. 29, 2006.

(51) Int. Cl.
*B01J 21/20* (2006.01)
(52) U.S. Cl. .......................................... 502/20; 502/34
(58) Field of Classification Search ................... 502/20, 502/34
See application file for complete search history.

(56) References Cited

U.S. PATENT DOCUMENTS

| | | | |
|---|---|---|---|
| 4,119,526 A | 10/1978 | Peters et al. |
| 4,409,095 A | 10/1983 | Peters |
| 5,001,095 A | 3/1991 | Sechrist |
| 5,376,607 A | 12/1994 | Sechrist |
| 5,824,619 A | 10/1998 | Sechrist et al. |
| 5,837,636 A | 11/1998 | Sechrist et al. |
| 6,034,018 A | 3/2000 | Sechrist et al. |
| 6,123,833 A | 9/2000 | Sechrist et al. |

OTHER PUBLICATIONS

UOP, Chlorsorb System, UOP Refining Process Technology and Equipment, 2005, p. 2 vol. UOP 4223-41, Publisher: UOP LLC, Published in: Des Plaines, IL, USA.

*Primary Examiner*—Edward M Johnson
(74) *Attorney, Agent, or Firm*—Maryann Maas

(57) ABSTRACT

In one exemplary embodiment, a process for regenerating a hydrocarbon conversion catalyst for a hydrocarbon conversion zone can generally include passing the hydrocarbon conversion catalyst through, sequentially, a catalyst-disengaging zone having a first atmosphere, an adsorption zone having a second atmosphere, and a regeneration zone including a combustion zone; introducing an inert gas between the first atmosphere and the second atmosphere; and passing a flue gas from the combustion zone to the adsorption zone.

16 Claims, 1 Drawing Sheet

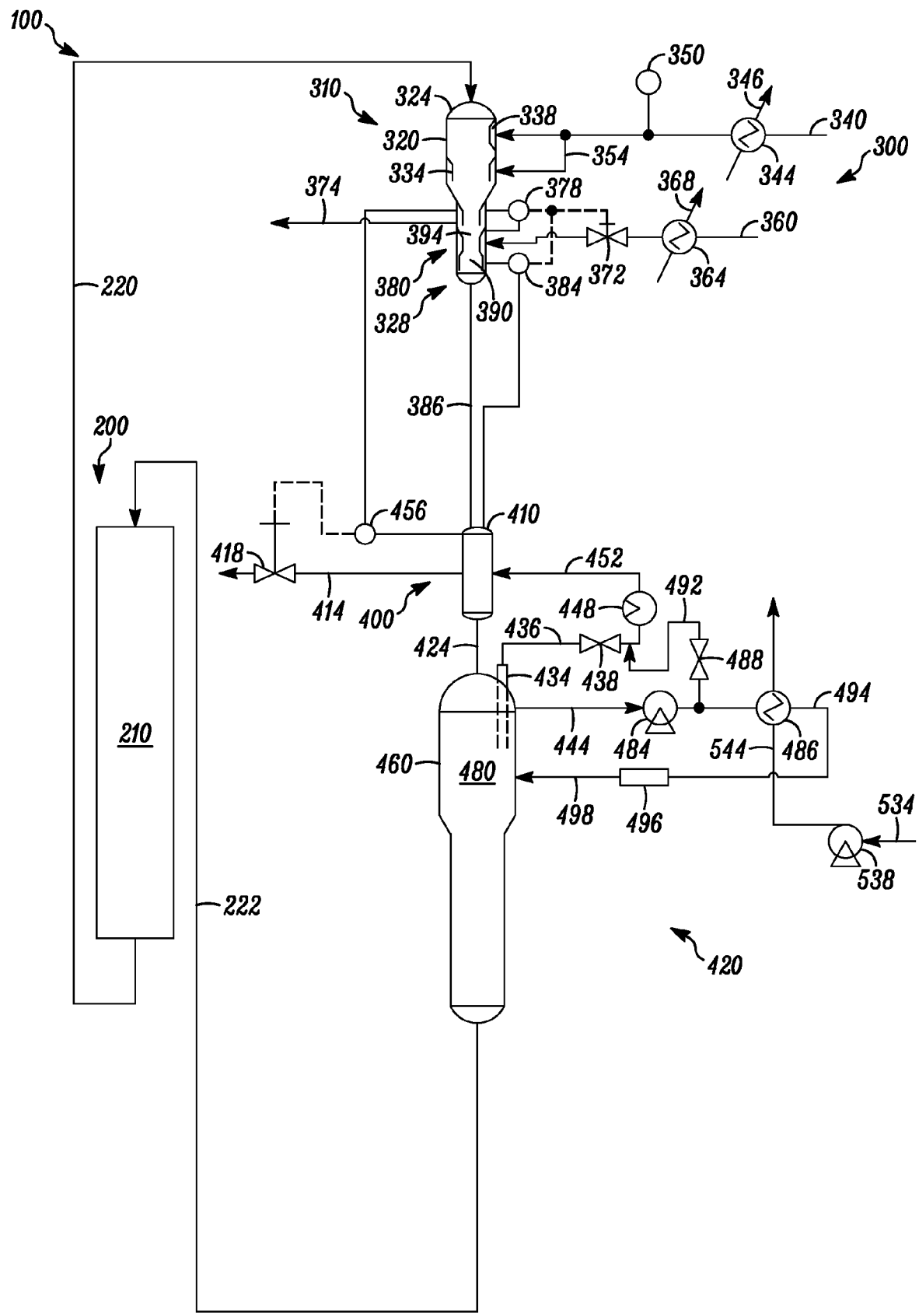

PROCESS FOR REGENERATING CATALYST FOR A HYDROCARBON CONVERSION ZONE

CROSS-REFERENCE TO RELATED APPLICATIONS

This application claims the benefit of U.S. Provisional Application No. 60/882,689 filed Dec. 29, 2006, which is hereby incorporated by reference in its entirety.

FIELD OF THE INVENTION

The invention generally relates to a process for regenerating a hydrocarbon conversion catalyst.

BACKGROUND OF THE INVENTION

Numerous hydrocarbon conversion processes can be used to alter the structure or properties of hydrocarbon streams. Generally, such processes include isomerization from straight chain paraffinic or olefinic hydrocarbons to more highly branched hydrocarbons, dehydrogenation for producing olefinic or aromatic compounds, reformation to produce aromatics and motor fuels, alkylation to produce commodity chemical and motor fuels, transalkylation and others. Typically, such processes use catalysts to promote hydrocarbon conversion reactions. As the catalysts deactivate, it is generally desirable to regenerate them with a moving bed regeneration system. Such moving bed regeneration systems are known and exemplary systems, which also disclose the removal of chlorides from a regeneration flue gas stream, are disclosed in U.S. Pat. No. 5,837,636 (Sechrist et al.) and U.S. Pat. No. 6,034,018 (Sechrist et al.). Generally, the gas for combustion is recycled with a portion purged as a flue gas stream. Typically, these regeneration systems remove halogen-containing material, such as chlorides, from the combustion zone flue gas stream. Usually, the flue gas is passed through a cooler prior to being sent through a vessel, such as a disengaging hopper, that contains spent catalyst, which adsorbs chlorides from the flue gas. Subsequently, the flue gas can be discharged to the atmosphere and the spent catalyst may pass to the regeneration zone.

However, it is desirable to prevent gas entrained with the spent catalyst from the reaction zone from mixing with gas from the regeneration vessel. Particularly, the gas entrained with the catalyst can contain hydrogen and hydrocarbons and the gas from the regeneration zone can contain oxygen along with nitrogen, carbon dioxide, water, and chlorides. Sometimes, a flue gas cannot be passed through the catalyst-disengaging hopper without risking gas associated with the spent catalyst being forced through the catalyst transfer lines. As a result, the gas associated with the spent catalyst that can contain hydrogen may be forced into the combustion zone of the regeneration vessel. The presence of such a gas in the high temperature and oxygen environment of the combustion zone would be highly undesirable and could lead to an uncontrolled combustion in the regeneration vessel. Alternatively, it is also desirable to prevent gas from the combustion zone from mixing with gas from the catalyst-disengaging hopper, and possibly the hydrocarbon conversion zone.

Therefore, it would be beneficial to provide a mechanism to remove halogen-containing material, such as chlorides, from the flue gas from a regeneration vessel used in conjunction with a hydrocarbon conversion unit, and generally at the same time separate gases associated with the spent catalyst from reaction gases associated with the regeneration vessel.

BRIEF SUMMARY OF THE INVENTION

In one exemplary embodiment, a process for regenerating a hydrocarbon conversion catalyst for a hydrocarbon conversion zone can generally include passing the hydrocarbon conversion catalyst through, sequentially, a catalyst-disengaging zone having a first atmosphere, an adsorption zone having a second atmosphere, and a regeneration zone including a combustion zone; introducing an inert gas between the first atmosphere and the second atmosphere; and passing a flue gas from the combustion zone to the adsorption zone.

Another exemplary embodiment can include a regeneration unit for a hydrocarbon conversion catalyst for a hydrocarbon conversion zone. The regeneration unit can include a catalyst-disengaging hopper having an upper portion and a lower portion receiving spent catalyst from the hydrocarbon conversion zone, an adsorption vessel communicating with the catalyst-disengaging hopper where an inert gas may be provided at least between the upper portion of the catalyst-disengaging hopper and the adsorption vessel, and a regeneration vessel including a combustion zone where a conduit may extend into the regeneration vessel and communicate the combustion zone with the adsorption vessel for passing a flue gas to the adsorption vessel.

A further exemplary embodiment can include a process for regenerating a catalyst for a hydrocarbon conversion zone. The process may include passing the catalyst through the hydrocarbon conversion zone, and subsequently, passing the catalyst through a regeneration unit. The regeneration unit can include a catalyst-disengaging zone containing an introduced buffer having an inert gas, an adsorption zone communicating with the catalyst-disengaging zone via a line wherein the line may receive spent catalyst from the catalyst-disengaging zone, and a regeneration zone.

Thus, the embodiments disclosed herein generally allow the adsorption of chloride compounds from a combustion flue gas by utilizing the spent catalyst from a hydrocarbon conversion zone. Particularly, the embodiments disclosed herein can provide an inert gas bubble or buffer, such as nitrogen bubble or buffer, between the hydrocarbon conversion zone gas, which often contains hydrogen, and the combustion zone gas, which often contains oxygen, of the regeneration vessel. Moreover, the embodiments disclosed herein can be added to an existing unit to lower the halogen-containing material in gas released to the atmosphere.

BRIEF DESCRIPTION OF THE DRAWING

FIG. 1 is a schematic process flow diagram showing an exemplary embodiment disclosed herein.

DEFINITIONS

As used herein, the term "zone" can refer to an area including one or more equipment items and/or one or more sub-zones. Additionally, an equipment item, such as a reactor or vessel, can further include one or more zones or sub-zones.

As used herein, the term "adsorption" can refer to the retention of a material in a bed containing an adsorbent by any chemical or physical interaction between a material, such as a halogen-containing material, in the bed, and includes, but is not limited to, adsorption, and/or absorption. The removal of the material from an adsorbent, is referred to herein as "desorption."

As used herein, the term "halogen-containing material" can include a halogen molecule, such as chlorine or fluorine, or a compound containing one or more independent halogen radicals. Examples of a halogen-containing material can include chlorine, fluorine, and hydrogen chloride.

As used herein, the term "buffer" or "bubble" generally refers to an inert gas, such as nitrogen, introduced into a region to create a volume of slightly higher pressure to prevent the intermingling of gases from respective first and second atmospheres.

DETAILED DESCRIPTION OF THE INVENTION

Before referencing the drawing FIGURE, a process for regenerating a hydrocarbon conversion catalyst can include a reforming reaction zone, a catalyst regeneration zone, and lines and equipment communicating with these zones as disclosed in e.g., U.S. Pat. No. 6,034,018 (Sechrist et al.), which is hereby incorporated by reference in its entirety. So, these zones are described schematically in the context of the present embodiments.

Also as discussed hereinafter in reference to the drawing FIGURES, more than one embodiment is depicted in a refinery or a petrochemical production facility to conserve drawing FIGURES. However, it should be understood that a refinery or a petrochemical production facility can include only one of these embodiments, or can include two or more in combination.

The systems and processes disclosed herein can be applicable to a wide range of catalytic hydrocarbon conversion processes including aromatic isomerization, paraffin or olefin isomerization, paraffin dehydrogenation, alkylation, and the regeneration of the catalyst. Hydrocarbon conversion processes may include reforming, alkylating, dealkylating, hydrogenating, hydrotreating, dehydrogenating, isomerizing, dehydroisomerizing, dehydrocyclizing, cracking, or hydrocracking. The exemplary embodiment depicted herein can be a reforming process.

Flue gas streams from regeneration units of such processes typically contain a halogen-containing material such as halides, particularly chlorides, which can require removal if the streams are discharged to the atmosphere.

Generally, these hydrocarbon processes utilize catalyst, which typically contain a metal, such as a noble Group VIII metal, and a halogen, such as chlorine or fluorine. However, catalytic reforming can be a widely practiced hydrocarbon conversion process that uses catalyst regeneration. Reforming catalysts typically contain chlorine. An exemplary catalytic reforming process is described in U.S. Pat. No. 5,837,636 (Sechrist et al.). The catalyst, which is often in particulate form, may include an alumina, such as an activated alumina, a silica alumina, a molecular sieve, or an alumina-silicate clay. An alumina-silicate clay may include a kaolin, an attapulgite, a sepiolite, a polygarskite, a bentonite, or a montmorillonite, particularly when the clays have not been washed by acid to remove substantial quantities of alumina. Such catalysts are disclosed in U.S. Pat. No. 6,034,018 (Sechrist et al.).

Referring to FIG. 1, a refinery or a petrochemical production facility 100 can include a hydrocarbon conversion unit 200 and a regeneration unit 300. The hydrocarbon conversion unit 200 may include at least one hydrocarbon conversion zone 210, which can include a plurality of reaction zones or sub-zones housed in one or more reactors. Typically, the conversion zones are arranged in a stacked reactor arrangement or in side-by-side reactors. Moving bed reactors are known to those of skill in the art and exemplary moving bed reactors are disclosed in U.S. Pat. No. 4,119,526 (Peters et al.) and U.S. Pat. No. 4,409,095 (Peters). The hydrocarbon conversion zone 210 can be operated at a pressure of about 0-about 6,900 kPa(g) (about 0-about 1,000 psig), desirably about 260-about 620 kPa(g) (about 37-about 90 psig). Generally, the hydrocarbon conversion zone 210 in this embodiment operates at a pressure above about 340 kPa(g) (about 50 psig), such as a pressure of about 280-about 660 kPa(g) (about 40-about 95 psig).

The general path of the catalyst to and from the hydrocarbon conversion unit 200 and the regeneration unit 300 is depicted. Particularly, the catalyst can enter at the top of the hydrocarbon conversion unit 200, pass through the at least one hydrocarbon conversion zone 210, and exit through a lift conduit 220. Subsequently, the catalyst may travel in the lift conduit 220 to a catalyst-disengaging zone 310 of the regeneration unit 300. Typically, the catalyst-disengaging zone 310 includes a catalyst-disengaging hopper 320 having an upper portion 324 and a lower portion 328, and contains more than one atmosphere. Generally, the upper portion 324 has a first atmosphere containing, e.g., hydrogen and hydrocarbons. Another atmosphere present in the catalyst-disengaging hopper 320 can contain an inert gas buffer 380, discussed hereinafter. Afterwards, the catalyst can pass through at least one catalyst transfer line 386 to an adsorption zone 400. The adsorption zone 400 may have a second atmosphere containing, e.g., typically less than about 1% by volume oxygen, and other gases such as nitrogen, carbon dioxide, water, chlorine and chlorides, such as hydrogen chloride. Next, the catalyst can pass through a line 424 (although multiple lines may be used) and a regeneration zone 420 that may include a regeneration vessel 460. Any suitable regeneration vessel 460 can be utilized, such as those disclosed in U.S. Pat. No. 6,034,018 (Sechrist et al.) and U.S. Pat. No. 5,824,619 (Sechrist et al.). Afterwards, the catalyst can pass through the regeneration vessel 460 and through a lift conduit 222 back to the hydrocarbon conversion zone 200.

Typically one or more gases, such as air and/or nitrogen, is provided to the regeneration vessel 460 for utilization in the combustion zone 480. The combustion zone 480 generally contains one or more combustion gases. These one or more gases traveling through the at least one of the lines 436 and 492 can be referred to as a flue gas, and the one or more gases traveling through the lines 444, 494, and 498 can be referred to as a recycle combustion gas. Generally, the flue gas and the recycle combustion gas can include up to about 1%, by volume, oxygen, and other gases that can include nitrogen, carbon dioxide, water, and chlorides, such as hydrogen chloride. Typically, the recycle combustion gas can travel through the line 444 to a recycle compressor 484, be cooled in an exchanger 486, and then pass through a line 494. As used herein, the term "compressor" generally means a device for transferring a fluid, especially a gas, and can include a device such as a compressor, a blower, or a fan. Desirably, the exchanger 486, and those described hereinafter whether heating or cooling, are, respectively, indirect heat exchangers utilizing any suitable medium such as air, water, or steam. In the depicted embodiment, air introduced in a line 534 from the discharge of a compressor 538 can pass through a line 544 to cool the recycle combustion gas. Subsequently, the cooled recycle combustion gas can pass through a heater 496 and then through a line 498 back into the combustion zone 480. The cooler 486 and the heater 496 may provide control of the temperature, and hence the rate of combustion, in the zone 480. Moreover, the heater 496 can be, independently, any suitable heater, including an electric heater, a furnace or a heat exchanger.

The combustion zone 480 can have a halogen-containing material, such as chlorides, present in a gas that is desirably removed before the gas is discharged to the atmosphere. Typically, a conduit 434 can extend into the combustion zone 480 of the regeneration vessel 460 to obtain a flue gas stream having a higher average water content and a lower average oxygen content as compared to the recycle combustion gas. Alternatively, the conduit 434 can couple the regeneration vessel 460 at the top and not extend into the vessel 460.

Generally, the adsorption vessel 410 and the regeneration vessel 460 can operate at a pressure ranging generally from about 0-about 6900 kPa(g) (about 0-about 1000 psig), preferably from about 30-about 620 kPa(g) (about 5-about 90 psig), more preferably from about 240-about 410 kPa(g) (about 35-about 60 psig), and optimally about 240-about 310 kPa(g) (about 35-about 45 psig). Usually the combustion zone 480 can be at a pressure of about 243 kPa(g) (about 35.3 psig). With the conduit 434 extended into the regeneration vessel 460, the flue gas obtained from the combustion zone 480 aids in minimizing the water content in the gas recycled in the lines 494 and 498 because the flue gas in the conduit 434 has a higher level of water than the recycle gas. Absent withdrawing flue gas from the conduit 434, the water content in the recycle gas can stabilize at a higher concentration. Withdrawing the combustion gas from the combustion zone 480 via the conduit 434 can minimize the water content in the recycle gas, which can prolong catalyst life by slowing the degradation in the catalyst surface area after repeated regenerations. Consequently, passing the flue gas through the conduit 434 in the regeneration vessel 460 can result in lower water content in the recycle gas.

A hood and screen can be provided at an inlet of the conduit 434 to prevent plugging due to catalyst particles. The conduit 434 can be provided, e.g., as disclosed in U.S. Pat. Nos. 5,001,095 and 5,376,607. The pressure in the regeneration vessel 460 can be at a slightly higher pressure, such as about 243 kPa(g) (about 35.3 psig) than the adsorption zone 400 at, e.g., about 240 kPa(g) (about 35.0 psig). The flue gas may escape through the conduit 434 and into a line 436. Afterwards, the flue gas can pass through a valve 438 and be subsequently cooled in an exchanger or cooler 448. Generally, the exchanger 448 is cooled with any suitable cooling fluid, such as air or water. In one exemplary embodiment, air from the compressor 538 can be utilized as the cooling fluid.

The gas then can proceed through a line 452 to the adsorption zone 400 that may include an adsorption vessel 410. The flue gas can pass through the vessel 410 and have a halogen-containing material, such as chlorides, adsorbed before exiting through a line 414 and a valve 418 to be discharged to the atmosphere. Although the adsorption vessel 410 is disclosed as a separate vessel with the line 424 between the vessels 410 and 460, which can decrease the amount of gas that may backflow from the regeneration vessel 460 to the adsorption vessel 410, it should be understood that the adsorption vessel 410 can be incorporated into the regeneration vessel 460 by residing above the combustion zone 480. As an example, the adsorption vessel 410 can be added to an existing regeneration vessel 460. In such an instance, integration can occur at a man-way present in the regeneration vessel 460. In both cases, the amount of gas that can flow from the regeneration vessel 460 to the adsorption vessel 410 may depend, in part, on the differential pressure between the regeneration vessel 460 and the adsorption vessel 410. Generally, the differential pressure can range from about 0.7-about 14 kPa(g) (about 0.1-about 2 psig), preferably about 2 kPa(g) (about 0.3 psig).

The flue gas exiting the combustion zone 480 can be at about 480-about 540° C. (about 900-about 1000° F.). If the combustion zone 480 is operating at low coking conditions, nitrogen can be added to the combustion zone 480 to increase the flue gas stream flow to have, e.g., sufficient gas flow for operating equipment. The flue gas that may enter the adsorption vessel 410 is generally about 66-about 480° C. (about 150-about 900° F.), preferably about 150-about 180° C. (about 300-about 350° F.). Usually, the adsorption vessel 410 operates at a pressure of about 241 kPa(g) (about 35.0 psig). Generally, the adsorption conditions are disclosed in U.S. Pat. No. 6,034,018 (Sechrist et al.). Typically, the total chloride removal in the flue gas stream is 99%, by mole, of the amount of chloride at the inlet. The chorine concentration in the flue gas stream can be reduced to about 1-about 10 mol-ppm and the hydrogen chloride concentration can be reduced to about 10-about 1000 mol-ppm. If after adsorption the halogen-containing material is still present at levels unacceptable for release to the atmosphere, any conventional means, such as chloride scrubbers, can be utilized for removing such material from the flue gas.

In another exemplary embodiment, the valve 438 can be closed and the valve 488 can be opened to allow a slip stream from the discharge of the recycle compressor 484 instead of withdrawing gas from the regeneration vessel 460. Particularly, a portion of the recycle combustion gas can be withdrawn through a line 492. Subsequently, the gas in the line 492 can pass through the cooler 448 and into the adsorption zone 400 through the line 452 for adsorbing halogen-containing material before exiting the adsorption zone 400, as described above.

Typically, the catalyst-disengaging zone 310 includes a catalyst-disengaging hopper 320, which can have the upper portion 324 and lower portion 328, as discussed above. Although the upper and lower portions 324 and 328 are depicted in the same vessel 320, it should be understood that each portion 324 and 328 can be contained in a separate vessel and communicate via a line. The pressure in the upper portion 324 and the lower portion 328 can generally range from about 0-about 6900 kPa(g) (about 0-about 1000 psig), preferably from about 30-about 620 kPa(g) (about 5-about 90 psig), more preferably from about 240-about 410 kPa(g) (about 35-about 60 psig), and optimally about 240-about 310 kPa(g) (about 35-about 45 psig). Typically, the lower portion has a pressure of about 243 kPa(g) (about 35.3 psig) and a pressure letdown pipe can be incorporated between the upper portion 324 and the lower portion 328.

In one exemplary embodiment, a portion of the recycle gas, containing hydrogen, from the hydrocarbon conversion zone 210 can be utilized to elutriate the spent catalyst in the catalyst-disengaging hopper 320. The elutriation gas can pass through a line 340 and be heated by an exchanger 344, using any suitable fluid, such as steam or another process stream, to a temperature, such as about 180° C. (about 350° F.), for the catalyst to adsorb material in the adsorption vessel 410. Typically, the temperature of the gas in the line 340 can be monitored with a thermocouple 350. Afterwards, the purified gas can enter a gas deflector 338, and if desired, annular baffles 334 through a line 354 to maintain the temperature of the catalyst for adsorption. In another exemplary embodiment if the disengaging hopper and regeneration vessel pressure exceeds the pressure of the hydrocarbon conversion zone, a net gas compressor can be utilized to supply gas to elutriate the spent catalyst. The gas from the net gas compressor can have a similar composition as the net gas, but can have a destination to a high pressure hydrogen header or a fuel gas header absent utilizing at least a portion to elutriate the spent catalyst.

The inert gas buffer 380 can be created between the gases from the hydrocarbon conversion zone 210 and the gases from the regeneration zone 420 that pass through the adsorption zone 400. Particularly, the inert gas buffer 380 may be located below the gas inlet for elutriating and heating the spent catalyst and above the adsorption zone 400. The inert gas, such as nitrogen, typically is passed through a line 360 and heated by a heat exchanger 364, with any suitable heat source, such as steam or another process stream, provided through a line 368. Afterwards, the nitrogen may pass through a valve 372 to the lower portion 328 of the catalyst-disengaging hopper 320. Typically, the inert gas buffer creates a volume at a slightly higher pressure of generally about 0.7-about 14 kPa(g) (about 0.1-about 2 psig), preferably about 2 kPa(g) (about 0.3 psig) than the surrounding regions to prevent intermingling of gases from the upper portion 324 (that may contain hydrogen) and from the adsorption vessel 410 (that may contain oxygen). Excess gas, typically having a composition of hydrogen, hydrocarbon, and nitrogen, can escape through a line 374 at a pressure of about 241 kPa(g) (about 35.0 psig). Differential pressure sensors 378 and 384 can monitor the differential pressure above and below the buffer 380 and control the introduction of nitrogen by the valve 372. The differential pressure sensor-controller 378 can measure the pressure difference between the zones 394 and 390 in the lower portion 328, while the differential pressure sensor-controller 384 may measure the pressure difference between the zone 390 and the adsorption vessel 410. Typically, the difference in pressure may be measured by each differential pressure sensor-controller 378 and 384 and is generally for each about 0.7-about 14 kPa(g) (about 0.1-about 2 psig), preferably about 2 kPa(g) (about 0.3 psig). In addition, the exiting of gas from the adsorption vessel 410 can be controlled by a differential pressure controller 456 monitoring the difference in pressures between the adsorption vessel 410 and near the entry point of the gases in the line 374. Typically the difference in pressure at these two points is maintained at about 0 kPa (about 0 psi), i.e. usually both points have a pressure of about 240 kPa(g) (about 35.0 psig). This pressure is slightly lower than the pressure associated with the inert gas buffer 380, which typically has a slightly higher pressure along the path of the catalyst flow. Generally, the catalyst-disengaging hopper 320 can be operated up to a temperature of about 260° C. (about 500° F.) and the line 386 has sufficient length to maintain the inert gas buffer 380 without excessive inert gas consumption.

In an alternative embodiment, although not depicted, the buffer 380 can be provided between the catalyst disengaging zone 310 and the adsorption zone 400, such as the line 386. In such an embodiment, the catalyst disengaging zone 310 can contain a single atmosphere having, e.g., hydrogen and hydrocarbons.

As discussed above, the present regeneration unit can include an adsorption zone 400 which can be added to an existing pressurized hydrocarbon conversion unit having a regeneration zone 420. Thus, this modification can be made to an existing unit and allow the recovery and removal of chlorides from a flue gas stream, that is optionally discharged to the atmosphere. Consequently, the present invention can improve the operations of existing units to meet environmental standards.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth uncorrected in degrees Celsius and, all parts and percentages are by volume, unless otherwise indicated.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A process for regenerating a hydrocarbon conversion catalyst for a hydrocarbon conversion zone, comprising:
   (a) passing the hydrocarbon conversion catalyst through, sequentially:
      (i) a catalyst-disengaging zone having a first atmosphere;
      (ii) an adsorption zone having a second atmosphere; and
      (iii) a regeneration zone comprising a combustion zone; and
   (b) introducing an inert gas between the first atmosphere and the second atmosphere; and
   (c) passing a flue gas from the combustion zone to the adsorption zone.

2. The process according to claim 1, wherein the inert gas comprises nitrogen.

3. The process according to claim 1, wherein the regeneration zone further comprises a regeneration vessel, which in turn comprises the combustion zone.

4. The process according to claim 3, further comprising a conduit extending into the regeneration vessel and combustion zone for communicating the flue gas with the adsorption zone.

5. The process according to claim 4, further comprising cooling the flue gas before entering the adsorption zone.

6. The process according to claim 1, wherein the flue gas is withdrawn from the combustion zone and passed through a recycle gas compressor and a portion is passed to the adsorption zone.

7. The process according to claim 6, further comprising cooling the flue gas before entering the adsorption zone.

8. The process according to claim 1, further comprising venting a gas from the adsorption zone.

9. The process according to claim 8, further comprising controlling the venting of the gas from the adsorption zone.

10. The process according to claim 1, wherein introducing the inert gas creates an inert gas buffer in the catalyst-disengaging zone.

11. The process according to claim 10, further comprising controlling the introduction of nitrogen into the inert gas buffer contained in the catalyst-disengaging zone.

12. The process according to claim 1, further comprising recycling at least a portion of a gas comprising hydrogen from the hydrocarbon conversion zone.

13. The process according to claim 1, wherein the adsorption zone comprises an adsorption vessel and the regeneration zone comprises a regeneration vessel, and a conduit communicates the adsorption vessel with the regeneration vessel.

14. A process for regenerating a catalyst for a hydrocarbon conversion zone, comprising:
   (a) passing the catalyst through the hydrocarbon conversion zone; and subsequently,
   (b) passing the catalyst through a regeneration unit, comprising:
      (i) a catalyst-disengaging zone containing an introduced buffer comprising an inert gas;
      (ii) an adsorption zone communicating with the catalyst-disengaging zone via a line wherein the line receives spent catalyst from the catalyst-disengaging zone; and
      (iii) a regeneration zone.

15. A process according to claim 14, further comprising passing a flue gas from the regeneration zone to the adsorption zone.

16. A process according to claim 15, further comprising a conduit extending into the regeneration zone for communicating the flue gas to the adsorption zone.

* * * * *